(12) United States Patent
Miller

(10) Patent No.: US 7,951,429 B2
(45) Date of Patent: *May 31, 2011

(54) HIGH ENERGY CURABLE COATINGS COMPRISING THERMOPLASTIC POLYMERS

(75) Inventor: Joseph E. Miller, Palos Heights, IL (US)

(73) Assignee: The Sherwin-Williams Company, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/434,853

(22) Filed: May 4, 2009

(65) Prior Publication Data

US 2009/0214877 A1    Aug. 27, 2009

Related U.S. Application Data

(63) Continuation of application No. 11/072,579, filed on Mar. 4, 2005, now Pat. No. 7,527,864.

(60) Provisional application No. 60/550,434, filed on Mar. 5, 2004.

(51) Int. Cl.
*B32B 27/00* (2006.01)
*B32B 27/10* (2006.01)
*C08F 2/48* (2006.01)
*C09D 4/00* (2006.01)

(52) U.S. Cl. ............ 427/508; 427/514; 428/411.1; 428/423.1; 428/500; 428/511; 522/83; 522/114; 522/116; 522/118; 522/120

(58) Field of Classification Search ............ 522/81, 522/83, 136, 141, 144, 138, 114, 116, 118, 522/120; 428/424.2, 424.4, 424.6, 424.7, 428/424.8, 423.1, 411.1, 500, 511; 427/499, 427/500, 512, 514, 508
See application file for complete search history.

(56) References Cited

U.S. PATENT DOCUMENTS

| | | | | | |
|---|---|---|---|---|---|
| 4,039,722 | A | * | 8/1977 | Dickie et al. | 428/461 |
| 4,069,364 | A | * | 1/1978 | Dickie et al. | 428/463 |
| 4,600,649 | A | * | 7/1986 | Leo | 428/412 |
| 6,037,014 | A | * | 3/2000 | Edgington | 427/544 |
| 6,426,034 | B1 | * | 7/2002 | McComas et al. | 264/494 |
| 6,677,045 | B1 | * | 1/2004 | Meisenburg et al. | 428/424.2 |
| 7,527,864 | B2 | * | 5/2009 | Miller | 428/423.1 |

* cited by examiner

*Primary Examiner* — Susan W Berman
(74) *Attorney, Agent, or Firm* — Deron A. Cook; Robert E. McDonald; Eryn Ace Fuhrer

(57) ABSTRACT

A radiation curable coating composition comprising:
(i) a thermoplastic polymer;
(ii) at least one ethylenically unsaturated adhesion-promoting monomer or oligomer;
(iii) at least one other ethylenically unsaturated radiation polymerizable reactant; and
(iv) at least one initiator for initiating cure.

19 Claims, No Drawings

HIGH ENERGY CURABLE COATINGS COMPRISING THERMOPLASTIC POLYMERS

CROSS-REFERENCE TO RELATED APPLICATION

This application is a continuation of U.S. patent application Ser. No. 11/072,579 filed on Mar. 4, 2005, now U.S. Pat. No. 7,527,864 which claims priority from U.S. provisional application No. 60/550,434 filed on Mar. 5, 2004, which applications are herein incorporated by reference.

This invention relates to radiation curable coatings, especially UV curable coatings, comprising a thermoplastic polymer, an ethylenically unsaturated adhesion-promoting monomer, and at least one other unsaturated reactant. These coatings show excellent cure, sandability and adhesion, to a variety of substrates including porous substrates such as wood. One application involves the use of the high energy curable coatings of this invention as primers which, after curing, can, if desired, be subsequently coated by a suitable topcoat.

This invention relates to radiation curable liquid coating compositions comprising:
(i) a thermoplastic polymer;
(ii) at least one ethylenically unsaturated adhesion-promoting monomer or oligomer;
(iii) at least one other ethylenically unsaturated radiation polymerizable reactant; and
(iv) at least one initiator for initiating cure.

The coatings can be applied to any substrate and then cured by exposure to radiation thereby providing adherent, sandable, durable cured coatings. The coatings can be cured by any suitable radiation such as electron beam or visible light or by ultraviolet radiation. In one useful application, the coatings of this invention are applied to a substrate such as wood, and, after cure are subsequently coated by a topcoat which is allowed to cure or dry.

DETAILED DESCRIPTION OF THE INVENTION

1. Thermoplastic Polymers

The thermoplastic polymers useful in the practice of this invention are film-forming polymers which are soluble in, or at least stably miscible with, the unsaturated adhesion-promoting monomers and the ethylenically unsaturated radiation polymerizable reactant. For some embodiments the thermoplastic polymers will be substantially free of ethylenic unsaturation which would co-polymerize with the unsaturated monomers and reactants. While it is not our intent to be bound by theory, it appears that the thermoplastic polymer, in addition to potentially lowering the Tg of the cured film, may help minimize shrinkage as the unsaturated materials cure upon exposure to the high energy radiation. Regardless of the causation, the addition of the thermoplastic polymer generally improves adhesion and flexibility of the final cured coating. As used herein the term "thermoplastic polymers" means a polymer which will not react with the ethylenically unsaturated reactants, monomers, or oligomers of this coating composition under high energy radiation curing conditions, and which polymer would soften or melt when exposed to heat, but would return to its original condition upon cooling.

Representative useful thermoplastic polymers include polyolefins such as polyethylene and polypropylene, polyesters, polycarbonates, polysulfones, polyimides, polyamides, polyurethanes, acrylics, styrene acrylics, polyvinyl chlorides, and others. For certain high solid applications, thermoplastic polymers having a number average molecular weight less than 35,000, and optionally less than about 20,000, and optionally less than 10,000, will provide relatively low viscosity solutions when dissolved in suitable amounts of the unsaturated monomers, oligomers and reactants. Thermoplastic acrylic polymers are generally useful to provide favorable cost and performance characteristics, and are conveniently prepared by methods well known in the art such as by solution polymerization of acrylic and/or methacrylic monomers in an appropriate solvent or diluent. Representative commercially available thermoplastic acrylic polymers useful in the invention include those offered by INEOS such as Elvacite 2927 (an n-butyl methacrylate/methyl methacrylate copolymer with a Tg of about 50° C. and an acid number of 3.5) and those offered by Dianal America such as MB-2595.

For some substrates, it is useful to utilize thermoplastic polymers having some pendant functional groups such as hydroxyl, acid, amine, epoxide, amide, SH, $SO_3H$, ureido, imidazole or other groups. Thermoplastic acrylic polymers having pendant functional groups can be readily prepared by the polymerization of one or more acrylic or methacrylic ester monomers along with monomers having pendant hydroxyl, acid, amine, epoxide, amide, SH, $SO_3H$, ureido and other groups. Representative monomers capable of free radical polymerization and having such functional groups include acrylic acid, methacrylic acid, acrylamide, methacrylamide, hydroxy ethyl acrylate, acrylamidopropanesulfonic acid, vinylsulfonic acid, aminoethylacrylate, dimethylaminopropylacrylate and methacrylate, 2-N-morpholinoethyl acrylate and methacrylate, vinylimidazole, N-2-(allylcarbamato)aminoethylimidazolidinone (WAM IV from Air Products and Chemicals), N-(3-allyloxy-2-hydroxypropyl)aminoethylethyleneurea) Sipomer® WAM from Alcolac). Typically, the functional group containing monomers will comprise less than about 30% of all the monomers in the acrylic polymer. In some embodiments of this invention, it can be useful to utilize thermoplastic polymers having amine functionality.

2. Ethylenically Unsaturated Adhesion-Promoting Monomers

The curable coatings of this invention will incorporate one or more ethylenically unsaturated adhesion-promoting monomers or oligomers to enhance the coating performance. The adhesion-promoting monomers or oligomers will be present at a level of at least 1% by weight solids of the combined weight of the thermoplastic polymer, the adhesion-promoting monomer or oligomer, and the ethylenically unsaturated radiation polymerizable reactant. Typically, the adhesion-promoting monomer or oligomer will be present at 1 to about 25% by weight of that combination and for many applications at 2 to about 10% by weight solids.

Adhesion-promoting monomers and oligomers are well-known in the art and in general are monomers and oligomers capable of free radical polymerization and which have at least one polar and/or potential salt forming group such as acid, amine, amido, ureido, oxazolidino or other N-heterocyclic group. Representative acid functional materials having carboxyl group functionality include acrylic acid, methacrylic acid, maleic acid, fumaric acid, itaconic acid, vinylsulfonic acid, and the polycarboxylic acids representatively taught in U.S. Pat. Nos. 5,633,327, 5,444,122. Useful acid-functional commercial products include Photomer® 4703, a carboxyl functional acrylic monomer available from Cognis Corporation, Ambler, Pa., and Ǝ-CEA produced by UCB Chemicals Corporation (comprising approximately 80% Ǝ-Carboxylethyl Acrylate and 20% acrylic acid). Representative amido containing monomers include acrylamide and methacrylamide. Representative nitrogen containing adhesion promoting monomers include amines such as hydroxyaminopropyl methacrylate, 3-amino methacrylate, 2-aminoethyl methacrylate, diethylaminoethyl methacrylate, 2-(1-aziridinyl) propylacrylate, and the N-heterocycle materials such as 3-(2-methacryloxyethyl)-2,2-spirocyclohexyl-oxzoladine. For certain applications it can be useful to incorporate acid functional monomers or oligomers as the adhesion-promoting material. In certain embodiments of this invention, it can be useful to utilize an acid-functional adhesion promoting monomer or oligomer and an amine-functional thermoplastic polymer in combination.

The radiation polymerizable reactants suitable for use in this invention can be any compound having polymerizable ethylenic unsaturation such as unsaturated polymers, oligomers, monomers or combinations thereof. Representative polymeric or oligomeric polyunsaturated compounds are well known in the art and can include, for example, unsaturated polyesters obtained by the reaction of polyols and maleic or fumaric acid, reaction products of polyacids or polyisocyanates with unsaturated alcohols, reaction products of polyepoxides and unsaturated acids such as acrylic or methacrylic acids, reaction products of polyols and unsaturated acids or esters, and other methods well known in the art.

For many applications, it is especially preferred to utilize unsaturated monomers and/or oligomers in order to minimize the viscosity and provide the highest application solids of the curable coatings. Especially useful monomers include vinyl and allyl compounds such as styrene, vinyl acetate, vinylidene chloride, and (meth)acrylates of monohydric alcohols, and similar (meth)acrylate acid derivatives, such as methyl methacrylate, 2-ethylhexyl acrylate, n-butyl acrylate and lauryl methacrylate. Especially preferred in the practice of this invention are the alkyl di-, tri-, and poly-acrylates such as, for example, ethylene glycol diacrylate, 1,3-propylene glycol diacrylate, 1,4-butanediol diacrylate, 1,4-cyclohexane diacrylate, 1,6-hexanediol diacrylate, neopentyl glycol diacrylate, 1,5-pentanediol diacrylate, 1,8-octanediol diacrylate, trimethylol propane triacrylate, pentaerythritol triacrylate, pentaerythritol tetraacrylate, and dipentaerythritol pentaacrylate.

For high solid applications to substrates, the curable compositions of this invention will typically comprise at least 5%, and normally 5-40% by weight thermoplastic polymer, at least 1% and typically 1 to about 20% by weight adhesion-promoting monomer, and at least 40% and typically 40 to about 94% by weight polymerizable reactant. The high solid applications would normally be non-aqueous solutions, and by appropriate blending of the components and selection of relatively low molecular weight components can be applied, if desired at 100% solids. Alternatively, small amounts of solvents can be incorporated. Compositions having a viscosity of less than 24 seconds on a #3 Zahn cup at 100% solids are particularly useful for vacuum coaing or spray application.

The polymerization of the curable compositions can be effected with, for example, UV light or electron beam or visible light and will typically include a suitable initiator for this cure. Polymerization is especially preferred by exposure to UV light. Suitable initiators include: acylphosphine oxides such as 2,4,6-trimethylbenzoyl diphenyl phosphine oxide, benzoyldiethoxyphosphine oxide and 2,4,6-trimethylbenzoyl dinaphthyl phosphine oxide; Michler's ketone; benzil; 2-chlorothioxanthone; 2,4-diethylthioxanthone; 2,4-diisopropylthioxanthone; 2-benzyl-2-(dimethylamino)-1-(4-(4-morpholinyl)phenyl)-1-butanone, commercially available as Irgacure7 369; camphoroquinone and mixtures thereof. Additional initiators include: acyloin and derivatives thereof, such as benzoin, benzoin methyl ether, benzoin ethyl ether, benzoin isopropyl ether commercially available as Vicure®R-30 from Stauffer Chemicals, benzoin isobutyl ether commercially available as Trigonal®-14 from Noury, and methylbenzoin; diketones such as diacetyl; aromatic diketones such as anthraquinone; phenones such as acetophenone, 2,2,2-tribromo-1-phenylethanone, 2,2-diethoxyacetophenone, 2,2-dimethoxy-2-phenylacetophenone commercially available as Irgacure7 651 from Ciba Geigy, 2,2,2-tribromo-1-(2-nitrophenyl)ethanone, benzophenone, and 4,4-bis(dimethylamino)benzophenone, 2-hydroxy-2-methyl-1-phenyl-propan-1-one commercially available as Darocur7 1173 from Ciba Geigy, hydroxycyclohexyl phenyl ketone commercially available as Irgacure7 184 from Ciba Geigy, 2-methyl-1-(4-(methylthio)phenyl)-2-morpholinopropanone-1 commercially available as Irgacure7 907 from Ciba Geigy, 2,2-dichloro-1-(4 phenoxyphenyl)ethanone commercially available as Sandoray®-1000 from Sandoz, chlorinated benzophenone aryl ketone commercially available as FI-4 from Eastman Kodak, and α-isobutyl-α-phenyl acetophenone commercially available as Vicure®-10 from Stauffer Chemicals.

The total amount of photoinitiator present in the coating composition is generally in the range of about 0.05-10% by weight of the total composition of thermoplastic polymers, monomers, oligomers, and reactants, preferably between about 0.2% and about 7%.

The curable compositions of this invention can also include additives which do not adversely effect curing of the coating. Suitable amounts of pigments, solvents, thixotropes, flow control additives, diluents, light stabilizers and other materials can be utilized. It is frequently useful for certain primer applications to incorporate both a hiding pigment such as titanium dioxide and an extender pigment such as calcium carbonate, barites, or silica into the curable compositions.

The curable compositions of this invention may typically be applied to any substrate such as metal, plastic, wood, glass, synthetic fibers, etc. by brushing, dipping, roll coating, flow coating, vacuum coating, spraying or other method conventionally employed in the art. Especially preferred substrates for the practice of this invention are porous substrates, especially wood substrates such as pine, where the coatings of this invention show particularly excellent adhesion and application at very high solids. The curable composition will be applied to the substrate typically to provide a dry film thickness of at least about 0.1 mil and will typically be applied between 0.1 and 10 mils dry film thickness.

The curing of the UV coating is completed by sufficient exposure to radiation to obtain the desired degree of cure. The curing is accomplished by exposing the coating to suitable radiation sources such as mercury lamps, xenon lamps, argon lamps, metal halide lamps, electron beams, or other device to produce the radiation.

Once the UV coating has been applied and cured, if desired, a topcoat can be applied onto the surface of the cured coating and the topcoat can be allowed to cure or dry. The topcoat may be any topcoat known in the industry, and can be an air-dry or a reactive curing system. One useful topcoat for applications requiring relatively low cure temperatures and good exterior durability, is the polyurethane topcoats obtained from hydroxy functional polymers and isocyanate functional crosslinkers. Other topcoats such as lacquers, latexes, alkyds, or urea or melamine cured polymers are also practical provided they can be cured or dried under conditions which are not harmful to the substrate.

The following examples have been selected to illustrate specific embodiments and practices of advantage to a more complete understanding of the invention. Unless otherwise stated, "parts" means parts-by-weight and "percent" is percent-by-weight.

A representative example of a coating which can be applied and cured as taught herein can be prepared as follows:

EXAMPLE I

The following materials were mixed utilizing a high-speed disperser:

| Raw Material | Parts |
| --- | --- |
| 1,6-hexanediol diacrylate | 195.50 |
| dispersant[1] | 2.78 |
| calcium carbonate | 500.00 |
| mix for 10 minutes | |
| titanium dioxide | 45.44 |
| mix for 10 minutes | |
| thermoplastic acrylic resin[2] | 105.37 |
| mix for 30 minutes @ 130° F. | |
| then wash sides of mixing vessel with | |
| 1,6-hexanediol diacrylate | 12.21 |
| then add slowly | |
| 1,6-hexanediol diacrylate | 75.08 |
| photoinitiator[3] | 22.26 |
| photoinitiator[4] | 43.59 |
| then wash sides of mixing vessel with | |
| 1,6-hexanediol diacrylate | 35.45 |
| then add | |
| carbon black | 0.10 |
| 1,6-hexanediol diacrylate | 106.59 |
| then add | |
| beta-carboxyethylacrylate mixture[5] | 73.94 |
| then add | |
| 1,6-hexanediol diacrylate | 8.50 |

[1]Solsperse ® 32000 polymeric amide.
[2]Dianal ® MB-2595 thermoplastic acrylic from Dianal America, Inc. having some pendant amine functionality, 99.0% NVM, an acid value less than about 0.6; Tg of 54; and a number average molecular weight of about 7000.
[3]Irgacure ® 819.
[4]Irgacure ® 184.
[5]β-CEA, produced by UCB Chemicals Corporation of Smyrna, Georgia and comprising approximately 80% β-Carboxylethyl Acrylate and 20% acrylic acid.

This composition was essentially 100% NVM and had a viscosity of approximately 13 seconds on a #3 Zahn cup (at 120° F.) and could be conveniently applied to a treated pine substrate by vacuum coating or by spray application. When applied to a treated pine substrate and cured using UV lamps, the coating provided excellent sandability and hiding and excellent adhesion. The same formulation prepared by replacing the thermoplastic acrylic polymer with the multifunctional acrylic monomers will show much poorer adhesion.

EXAMPLE II

A representative formula could be prepared by mixing the following materials utilizing a high-speed disperser:

| Raw Material | Parts |
| --- | --- |
| tripropylene glycol diacrylate | 221.20 |
| dispersant[1] | 2.78 |
| calcium carbonate | 500.00 |
| mix for 10 minutes | |
| titanium dioxide | 45.44 |
| mix for 10 minutes | |
| thermoplastic acrylic resin[2] | 79.05 |
| mix for 30 minutes @ 130° F. | |
| then wash sides of mixing vessel with | |
| tripropylene glycol diacrylate | 12.21 |
| then add slowly | |
| tripropylene glycol diacrylate | 75.08 |
| photoinitiator[3] | 22.26 |
| photoinitiator[4] | 43.59 |
| then wash sides of mixing vessel with | |
| tripropylene glycol diacrylate | 35.45 |
| then add | |
| carbon black | 0.10 |
| tripropylene glycol diacrylate | 106.59 |
| then add | |
| acid-functional acrylic monomer[5] | 73.94 |
| then add | |
| tripropylene glycol diacrylate | 8.50 |

[1]Solsperse ® 36000 polymeric acid.
[2]Elvacite ® 2927 thermoplastic acrylic from INEOS Acrylics, Cordova, TN.
[3]Lucerin ® TPO.
[4]Darocur ® 1173.
[5]Photomer ® 4703.

While this invention has been described by a specific number of embodiments, other variations and modifications may be made without departing from the spirit and scope of the invention as set forth in the appended claims.

The invention claimed is:

1. A radiation curable coating composition comprising:
   (i) a film forming thermoplastic polymer having a number average molecular weight less than 10,000;
   (ii) at least one ethylenically unsaturated adhesion-promoting monomer or oligomer having a functional group selected from the group consisting of amine, carboxyl, sulfonic, amido, ureido and N-heterocyclic functional groups;
   (iii) at least one ethylenically unsaturated radiation polymerizable reactant other than component (ii); and
   (iv) at least one initiator for initiating cure upon exposure to radiation.

2. The coating composition of claim 1 wherein the adhesion-promoting monomer or oligomer is present at a level of at least 1% by weight of the combined weight of thermoplastic polymer, adhesion-promoting monomer or oligomers and other radiation polymerizable reactant.

3. The coating composition of claim 1 wherein the thermoplastic polymer is present at a level of at least 5% by weight of the combined weight of thermoplastic polymer, adhesion-promoting monomer or oligomer and other radiation polymerizable reactant.

4. The coating composition of claim 1 wherein the polymerizable reactant is present at a level of at least 40% by weight of thermoplastic polymer, adhesion-promoting monomer or oligomer and other radiation polymerizable reactant.

5. The coating composition of claim 1 wherein the composition also incorporates a pigment.

6. The coating composition of claim 1 wherein the thermoplastic polymer has a Tg greater than 30° C.

7. The coating composition of claim 1 wherein the thermoplastic polymer is substantially free of polymerizable ethylenic unsaturation.

8. The coating composition of claim 1 wherein said composition is non-aqueous.

9. The coating composition of claim 1, wherein the at least one ethylenically unsaturated adhesion-promoting monomer or oligomer comprises acrylic acid.

10. A method of coating a substrate comprising:
   (a) providing an appropriate substrate;

(b) depositing onto at least one surface of the substrate a coating composition comprising:
  (i) a film forming thermoplastic polymer having a number average molecular weight less than 10,000;
  (ii) at least one ethylenically unsaturated adhesion-promoting monomer or oligomer having a functional group selected from the group consisting of amine, carboxyl, sulfonic, amido, ureido and N-heterocyclic functional groups;
  (iii) at least one ethylenically unsaturated radiation polymerizable reactant other than component (ii); and
  (iv) at least one initiator for initiating cure upon exposure to radiation; and
(c) exposing the applied coating to a curing amount of high energy radiation to produce a cured adherent coating.

11. The method of claim 10 wherein the substrate is a porous substrate.

12. The method of claim 11 wherein the porous substrate is wood.

13. The method of claim 10 wherein the method also comprises the additional steps of:
  (d) depositing onto the surface of the cured coating a topcoat; and
  (e) allowing the topcoat to cure or dry.

14. The method of claim 10 wherein the coating is deposited by a vacuum coating process.

15. The method of claim 10 wherein the high energy is ultraviolet light.

16. The method of claim 10 wherein the high energy is an electron beam.

17. The method of claim 13 wherein the topcoat is a polyurethane topcoat.

18. A substrate coated with a multi-layer decorative and/or protective coating which comprises a primer coat layer and a topcoat layer and wherein the primer coat layer comprises the reaction product obtained by the radiation cure of a liquid coating composition comprising:
  (i) a film forming thermoplastic polymer;
  (ii) at least one ethylenically unsaturated adhesion-promoting monomer or oligomer having a functional group selected from the group consisting of amine, carboxyl, sulfonic, amido, ureido and N-heterocyclic functional groups;
  (iii) at least one ethylenically unsaturated radiation polymerizable reactant other than component (ii); and
  (iv) at least one initiator for initiating cure.

19. The substrate of claim 18 wherein the topcoat layer comprises a polyurethane.

* * * * *